United States Patent [19]

Sims

[11] 4,018,731

[45] Apr. 19, 1977

[54] HIGH IMPACT POLYAMIDES

[75] Inventor: Willard M. Sims, Leominster, Mass.

[73] Assignee: Foster Grant Co., Inc., Leominster, Mass.

[22] Filed: June 12, 1975

[21] Appl. No.: 586,332

[52] U.S. Cl. .................. 260/23.7 N; 260/31.2 N; 260/326 R; 260/37 N; 260/45.9 R

[51] Int. Cl.² ............................................. C08L 91/00

[58] Field of Search ................ 260/23.7 N, 31.2 N, 260/32.6 R, 37 N, 45.9 R

[56] References Cited

UNITED STATES PATENTS

| | | | |
|---|---|---|---|
| 3,645,932 | 2/1972 | Harrison | 260/23.7 M |
| 3,671,478 | 6/1972 | Doyle | 260/23.7 M |

Primary Examiner—Melvyn I. Marquis
Assistant Examiner—William E. Parker
Attorney, Agent, or Firm—Michael J. Tully

[57] ABSTRACT

A high impact polyamide resin is prepared by interpolymerizing with polyamide forming monomers a minor amount of an approximately equi-molar mixture of a low molecular weight diolefin polymer, and a dimerized fat acid or acid derivative, said diolefin polymer and dimerized fat acid or derivative having terminal amide-forming functional groups of each end of the polymer chain.

9 Claims, No Drawings

HIGH IMPACT POLYAMIDES

BACKGROUND OF THE INVENTION

The present invention relates to polyamide resins having exceptionally high impact strength prepared by forming an interpolymer of at least one polyamide forming monomer with a mixture comprising a low molecular weight diolefin polymer and a dimerized fat acid or derivative thereof, said diolefin polymer and dimerized fat acid or acid derivative having terminal amide-forming functional groups on each end of the molecular chain.

Polyamide resins have long been known for their excellent toughness, flexibility, abrasion resistance and relatively good impact strength. Molded or extruded polyamides in general have found applications in appliances, consumer products, electronics, machine components, automotive parts, gears and like uses.

Although the polyamides are noted for their toughness and relatively good impact strength, there are many speciality applications where exceptional strength is required. These specialty applications include automotive uses of molded parts formed from polyamides such as bumpers, deflection shields, light shields, and like items which at times may be subject to severe impact from external sources. Thus, whereas the most popular polyamides in terms of price and availability, e.g., polycaprolactam or polyhexamethylene adipamide, are generally suited for most applications, there is some reluctance in using these and other materials in applications where exceptional impact resistance is a requirement.

Various attempts have been made in the prior art to increase the impact strength of polyamides. The most common technique involves plasticization. However, plasticizers may deleteriously affect other properties such as processing behavior, modulus and tensile strength to the point where the advantage of moderatley increased impact strength is outweighed by these disadvantages. Other techniques for improving impact strength involves blending polyamide resins with other polymers such as ethylene/alkyl acrylate copolymers as disclosed in U.S. Pat. No. 3,472,916, or ethylene/ unsaturated carboxylic acid copolymers as disclosed in U.S. Pat. No. 3,236,914. U.S. Pat. No. 3,388,186 discloses polylactams of improved impact strength prepared by polymerizing the lactam monomer in the presure of a minor amount of an ethylene copolymer containing acid groups. Other methods for improving impact strength of a given polyamide homopolymer such as polycaprolactam or polyhexamethylene adipamide include the formation of higher molecular weight copolymers of the relevant monomer or salt with other specific polyamide forming monomers or their salts, which yield polymers of impact strength higher than the given polyamide hompopolymer. Although these and other impact modification techniques are effective, the availability of raw materials, the increased complexity of preparation, or cost considerations are mitigating factors toward their wide acceptance.

Accordingly, it is an object of this invention to provide polyamide polymers having improved mechanical properties.

A more specific object is to provide polyamide polymers having high resistance to impact.

SUMMARY OF THE INVENTION

These and other objects of the invention are achieved by forming an interpolymer composition by the interpolymerization of a polyamide forming monomer or mixture of monomers with a minor amount of an approximately equimolar mixture comprising a low molecular weight diolefin polymer and a dimerized fat acid or derivative thereof, said diolefin polymer and dimerized fat acid or acid derivative having amide-forming functional groups at each terminal end of the molecule. The interpolymerization product so obtained is believed to be composed of a mixture of polyamide homopolymer or copolymer based on the amide-forming monomers having dispersed therein a plurality of polyamide copolymers having one or more recurring amide units derived from the diolefin and dimerized fat acid. This product may be characterized as of extremely high impact strength and may be advantageously employed as a molding or extrusion material in those applications where mechanical strength, toughness and durability are prerequisites.

DETAILED DESCRIPTION OF THE INVENTION

The high impact polyamide interpolymer compositions of the present invention may be generally characterized as compositions wherein at least some of the polymer chains contains one or more of the following structural units:

(a) 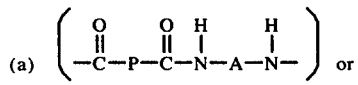 or (b) 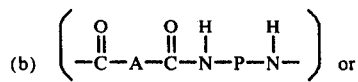 or (c) 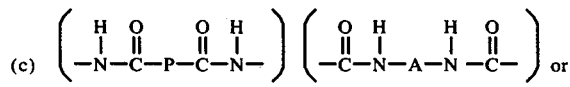 or (d) 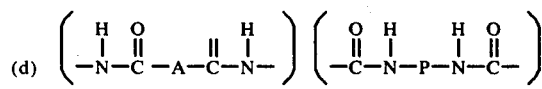

wherein P represents a polydiolefin radical having a molecular weight within the range of about 1,000 to 20,000, and A represents a dimeric fat radical having from about 16 to 48 carbon atoms. These polyamide compositions are more specifically characterized as polyamides wherein a major portion of the chains are derived from conventional polyamide forming monomers such as polycaprolactam or polyhexamethylene adipamide, with some of these conventional chains having one or more of the above structural units present at random points along the polymer chain or at one or both terminal points on the chain.

The high impact polyamide compositions may be prepared by interpolymerizing a conventional polyamide forming monomer or mixture of monomers with an approximately equi molar mixture comprising the diolefin polymer and the fat acid or acid derivative, or with a salt prepared by combining under salt-forming conditions approximately stoichiometric amounts of the diolefin polymer and fat acid or acid derivative, or with a low molecular weight polymer, such as a dimer or trimer, formed by partially polymerizing an approximately eqimolar mixture of these components using catalysts commonly employed for the polymerization of polyamide forming monomers. Compositions thus prepared are believed to consist of a dispersed system containing some polymer chains of the conventional polyamide and other chains containing both conventional polyamide segments and segments as illustrated by formulas (a) through (d) above either terminally or randomly positioned in the polymer chain. Regardless of the precise structure of the interpolymerized composition, it has been found that the impact strength of conventional polyamides is markedly increased by forming interpolymers in accordance with the teachings of the present invention.

Dimerized fat acids which may be used in the invention are prepared from fat acids which include any naturally occurring or synthetic monobasic aliphatic acids having from 8 to 24 carbon atoms in the chain, which have been polymerized (or dimerized) to form a dibasic acid having 16 to 48 carbon atoms in the chain. The monobasic fat acid may be saturated or unsaturated, although the unsaturated acids are preferred because of their ease of polymerization and because they are most readily available. Polymerization may be accomplished at high temperatures using a peroxide catalyst or, in the case of the unsatruated acids, at high temperatures with or without a catalyst. A more detailed description of these acids and methods of polymerization may be found on column 2 of U.S. Pat. No. 3,242,141, incorporated herein by reference. A distilled dimer acid having 36 carbon atoms prepared from mixtures of dimerized oleic and linoleic acid is the preferred material for the present invention. Instead of the acids themselves, amide-forming derivatives such as acid halides or alkyl or aryl esters thereof may be suitably employed.

The dimerized fat acid or acid derivatives may be employed directly as an amide-forming reactant where the co-reactant diolefin polymer contains terminal amino groups. In the embodiment where the diolefin polymer contains terminal carboxy groups, then the dimer acid must first be converted to the diamine. This may be accomplished using textbook techniques such as by reacting the dimerized acid with ammonia to obtain the corresponding dimerized fat nitrile which may then be hydrogenated to form the dimer diamine.

The diolefin polymer having amide-forming terminal functionality suitable for the practice of the present invention may be derived from any anionically polymerizable conjugated diene monomer or mixture of monomers, such as butadiene or isoprene, and mixtures of these monomers with minor amounts, i.e., less than about 35% by weight, of other copolymerizable monomers such as styrene and/or acrylonitrile. Preferred diolefin polymers are liquid or semi-liquid materials having an average molecular weight in the range of about 1,000 to 20,000, preferably from about 1,000 to 10,000. The infrared microstructure of typical polymers shows a cis content within the range of about 20 – 50%, a trans content of about 30 to 60% and a vinyl content of about 15 to 35%.

Diolenfin polymers useful in the present invention are known in the art as, for example, disclosed in U.S. Pat. No. 3,150,209, and are generally commercially available. Their method of synthesis is not intended to be encompassed by the present invention. briefly, however, these materials may be most readily prepared by polymerizing the appropriate monomer or monomer mixture in a solvent using an anionic polymerization catalyst such as sodium or lithium metal, or an arganoalkali metal compound such as a sodium-naphthalene complex, and conducting the polymerization for a period of time and at a temperature such that a "living polymer" of appropriate molecular weight is formed having the metalcation at both ends of the propagated molecule. These alkyl metal derivative end groups may then be treated with carbon dioxide and hydrolyzed to form the polydiolefin dicarboxylic acid. As in the case with the fat acid, amide forming derivatives of the polydiolefin dicarboxylic acid, including halides and alkyl or aryl esters may be employed.

Where the fat acid or acid derivative is used directly as an amide forming comonomer, then the polydiolefin must be converted to the corresponding diamine. This may be accomplished by reacting the polydiolefin dicarboxylic acid with ammonia under nitrile forming conditions to form the dinitrile, followed by hydrogenation.

Preferred diolefin polymers are conjugated diene homopolymers having from four to twelve carbon atoms per molecule, such as polybutadiene, polyisoprene and like polymers. These polymers may be partially or totally hydrogenated to improve the stability of the polyamide compositions containing them.

In the preferred embodiment of the invention, the polyamide compositions are prepared using the carboxy diolefin polymer and fatty dimer diamine since these materials are easiest to prepare and are most readily available from commercial sources. For example, suitable carboxy terminated polybutadienes are available from Phillips Petroleum Company under the trade name "Butarez CTL." A fatty diamine having 36 carbon atoms such as disclosed in U.S. Pat No. 3,242,141 is available from General Mills Corporation under the trade name "Dimer Diamine."

The conventional polyamides which may be interpolymerized with the above described reaction mixture are generally characterized as having the recurring

structural group present in the polymer chain and include the so-called A-type polyamides such as prepared by the condensation polymerization of a divalent carboxylic acid and a divalent diamine, B-type polyamides prepared by the addition or condensation polymerization of a lactam or amino carboxylic acid, a copolymer type polyamide of at least two of a divalent carboxylic acid, a divalent diamine, a lactam and an amino carboxylic acid, or a mixture of the foregoing monomers. The lactams or amino carboxylic acids used preferably contain from about 6 to 12 aliphatic, cycloaliphatic or aromatic carbon atoms, and the diacids and diamines may contain from about 2 to 20 carbon atoms, preferably 2 to 12 carbon atoms. Typical of polyamide-forming monomers are those used in the preparation of polyhexamethylene adipamide, polyhexamethylene sebacamide, polycaprolactam, polylauryllactam, copolymers of epsilon caprolactam and hexamethylenediammonium adipate, and like materials.

As previously indicated, the interpolymer compositions of the present invention may be prepared using any of the techniques common in the prior art for preparing analogous polyamide homopolymers or copolymers such as simple condensation or addition polymerization at temperatures in excess of about 180° C or by melt, interfacial or solution catalytic processes using anionic or acidic catalysts. The simplest technique for the purposes of the present invention is a simple condensation process wherein an amide-forming mixture comprising the diolefin polymer and fat acid is first formed, followed by the addition of conventional polyamide forming monomers or monomer salts and heating of the mixture to polyamide forming temperatures, generally between 180° to 300° C either in the presence or absence of a diluent and under conditions which will permit water formed during the reaction to escape. Alternatively, the mixture may be in the form of the ammonium salt of the diolefin polymer and fat acid formed by preparing an aqueous or alcoholic solution of the fat acid, combining this with an aqueous dispersion of the diolefin polymer in stoichiometric quantities, and this mixture optionally concentrated by evaporating off some of the liquid. This concentrate may be then mixed with a conventional polyamide forming monomer such as epsilon caprolactam or monomer salt such as hexamethylene-diammonium adipate, and the mixture heated in a closed vessel under pressure at temperatures within the range of about 180° to 300 C until such time as a polyamide composition of molding or extruding grade is formed. The composition may be removed from the polymerization vessel by applying pressure and extruding it through an oriface in the vessel.

In most cases it is desirable to include a modifier or chain terminator in the polymerization mixture as is known in the art to control the molecular weight and relative viscosity of the polymer product to within the range of about 10,000 to 30,000 and about 2 to respectively, 4 which are the most suitable values for a molding or extrusion grade material. Examples of suitable modifiers are mono or di carboxy acids or mono or di amines such as acetic acid, azalaic acid, ethyl amine, hexamethylene diamine and like materials. Preferably, the modifier has the same kind of chemical functionality as the diolefin amide-forming reactant and is used at a level of less than 1% by weight of all the reactive amide-forming ingredients present in the composition.

The amount of the diolefin/fat acid or acid derivative mixture required to prepare polyamide compositions of high impact strength will vary depending upon the degree of impact strength improvement desired. Generally speaking, from about 1 to 20% by weight of the mixture based on the total polyamide weight is suitable. The degree of impact improvement increases as the level is increased within the 1 to 20% range. At higher levels within this range, the crystallinity and melting points of some of the conventional polyamides may be adversely affected with concomitant changes in the hardness and solvent resistance of the resulting interpolymer composition, although in some applications this is not especially undesirable. With the more conventional polyamides such as polycaprolactam or polyhexamethylene adipamide, optimum results in terms of impact resistance are achieved when the mixture is employed at a level of about 5 to 15% by weight of the composition.

Compositions prepared according to the present invention may also contain ingredients as are known in the polymer arts including pigments, fillers such as channel black or silica, lubricants, nucleating agents, stabilizers, anti oxidants, plasticizers and like additives.

The following examples are illustrative of the invention.

|  | Parts by weight |
|---|---|
| Caprolactam | 5341.0 |
| Butarez CTL[1] | 596.4 (0.119 mole) |
| Dimer Diamine[2] | 62.4 (0.116 mole) |
| Azelaic Acid | 30.0 |
| Water | 170.0 |

[1]Butarez CTL is a liquid carboxy terminated polybutadiene available from Phillips Petroleum Company having a carboxy content of about 1.75 wt. % and a molecular weight of about 5,000.
[2]Dimer Diamine is available from General Mills Corporation and is characterized as the diamine derivative of a polymerized (dimerized) fat acid having 18 carbon atoms.

The contents of the reactor were stirred at a moderate temperature above the melting point of the caprolactam for a sufficient period of time to allow for the in-situ reaction of the Butarez and Dimer Diamine to form the corresponding diammonium salt. Thereafter, the reactor was sealed and the temperature of the mixture was raised to a caprolactam polymerization temperature of 450° F and maintained at this temperature for about four hours at 30 – 35 psig. The reactor was then depressurized and maintained at a temperature of 485° F for about 16 hours during which time the reactor was continuously swept with nitrogen.

The resulting molten polymer composition was then extruded in the form of thin rods, cooled and pelletized.

The resulting polymer exhibited a relative viscosity in meta cresol of 2.82, a melting point of about 223° C, and a water extractable content of 7.14%. The physical property data obtained on the water extracted polymer is as shown in Table 1.

EXAMPLE II

A batch of polycaprolactam was prepared by charging the following ingredients into a reactor:

|  | Parts by weight |
|---|---|
| Caprolactam | 6000 |
| Azelaic Acid | 30 |
| Water | 170 |

The reactor was sealed and the temperature was raised to 450° F. The contents of the reactor were then polymerized and recovered as recited in Example I.

The resulting polymer exhibited relative viscosity in meta cresol of 2.78, a melting point of 220°–225° C, and a water extractable content of 10.3%. The physical property data obtained on the water extracted polymer is as as shown in Table 1.

EXAMPLE III

The following ingredients were charged into a reactor, polymerized, and the polymer recovered as in Example I:

|  | Parts by weight |
|---|---|
| Caprolactam | 5670.0 |
| Butarez CTL | 298.2 |
| Dimer Diamine | 31.2 |
| Azelic Acid | 28.0 |

| | -continued | |
|---|---|---|
| | | Parts by weight |
| Water | | 170.0 |

The resulting polymer exhibited a relative viscosity in meta cresol of 3.17, a water extractable content of about 10%, and a melting point of about 220° C. The physical property data obtained on the water extracted polymer is as shown in Table 1.

TABLE 1

| | ASTM Test Method | Ex. 1 | Ex. 2 | Ex. 3 |
|---|---|---|---|---|
| Izod Impact | (D-256A) | No fail** | 0.98 | 1.57 |
| Deflection temp. | (D-648) | 57.1° C | 56.0° C | 62.5° C |
| Tensile stress at yield | (D-638) | 8867 | 10,000 | 10,293 |
| Elongation at yield | (D-638) | 4.8 | 4.5 | 4.6 |
| Tensile stress at fail | (D-638) | 7880 | 5800 | 8533 |
| Elongation at fail | (D-638) | 97.7 | 120 | 24.5 |
| Elastic modulus | (D-790) | 308,000 | 338,000 | 371,000 |
| Flexural strength at yield | (D-790) | 11,933 | 13,500 | 13,329 |
| Deflection at yield | (D-648) | 0.730 | 0.650 | 0.728 |
| Modulus of elasticity | (D-790) | 303,000 | 360,000 | 350,000 |
| Rockwell hardness | (D-785) | R 111 | 116 | 115 |
| | | L 84 | 92 | 94 |
| | | M 17 | 65 | 68 |

Note:
**NO FAIL means an impact strength in excess of about 15 ft. lbs/in.

A comparison of the impact data presented in Table 1 reveals a marked increase in impact strength of the polyamide compositions prepared in accordance with the present invention as compared with a polyamide which does not contain the fat acid/diolefin combination. The caprolactam polymer of Example I containing about 10% by weight of the diolefin/ fat acid combination exhibits at least a 15 fold increase in impact strength while the polymer of Example III containing about 5% by weight of the diolefin/fat acid combination shows better than a 50% increase in impact strength when compared with a regular commercial polycaprolactam (Nylon 6) such as prepared in Example II.

Although the invention is described with particular reference to specific examples, it should be understood that the invention should not be so limited but limited only by the scope of the appended claims.

What I claim is:

1. A polyamide composition comprising the interpolymerization product of a polyamide-forming monomer or mixture of monomers selected from the group consisting of:
   a. a lactam
   b. an amino carboxylic acid
   c. a mixture of a divalent carboxylic acid and a divalent diamine
   d. a mixture of at least two of a, b and c, and from about 1 to 20% by weight of said polyamide composition of an approximately equi molar mixture of a diolefin polymer having an average molecular weight within the range of about 1,000 to 20,000 and a dimerized fat acid or fat acid derivative having from 16 to 48 carbon atoms, each of said diolefin polymer and fat acid or fat acid derivative having amide-forming functional groups at each terminal position in the molecular chain.

2. The composition of claim 1 wherein said diolefin polymer is a carboxy terminated conjugated diene having from 4 to 12 carbon atoms per monomer molecule and having a molecular weight within the range of about 1000 to 10,000.

3. The composition of claim 2 wherein said conjugated diene is polybutadiene.

4. The composition of claim 3 wherein said fat acid or fat acid derivative is a distilled diamine having 36 carbon atoms derived from a dimerized mixture of oleic and linoleic acids.

5. The composition of claim 4 wherein said mixture of diolefin polymer and fat acid diamine is present at a level of about 5 to 15% by weight of said polyamide composition.

6. The composition of claim 2 wherein said mixture of said diolefin polymerr and said dimerized fat acid comprises the ammonium salt of a carboxy terminated polybutadiene and a distilled diamine having 36 carbon atoms derived from a dimerized mixture of oleic and linoleic acids.

7. The composition of claim 6 wherein said polyamide forming monomer is caprolactam.

8. The composition of claim 7 wherein said ammonium salt is present at a level of about 5 to 15% by weight of the composition.

9. The composition of claim 6 wherein said polyamide forming mixture of monomers comprises adipic acid and hexamethylene diamine.

* * * * *